United States Patent [19]

Shackelford

[11] Patent Number: 4,577,527

[45] Date of Patent: Mar. 25, 1986

[54] DIFFERENTIAL DRIVE MECHANISM

[75] Inventor: Michael L. Shackelford, Emporia, Kans.

[73] Assignee: Didde Graphic Systems Corporation, Emporia, Kans.

[21] Appl. No.: 544,514

[22] Filed: Oct. 24, 1983

[51] Int. Cl.[4] ............................................. F16H 33/00
[52] U.S. Cl. ....................................... 74/640; 474/72; 474/79; 474/133
[58] Field of Search ................ 474/8, 58, 69, 72, 133, 474/79; 74/640

[56] References Cited

U.S. PATENT DOCUMENTS

| | | | |
|---|---|---|---|
| 2,164,019 | 6/1939 | Perry | 474/8 |
| 2,906,143 | 9/1959 | Musser | 74/640 |
| 3,380,313 | 4/1968 | Bulin | 474/58 |
| 3,565,006 | 2/1971 | Stewart | 74/640 X |

FOREIGN PATENT DOCUMENTS 1379553 1/1975 United Kingdom .................... 474/8

OTHER PUBLICATIONS

Harmonic Drive Catalogue, USM Corporation-Speed Reducers and Component Sets, Series E.
Harmonic Drive Catalogue—Pancake Gearing, USM Corporation.

Primary Examiner—James A. Leppink
Assistant Examiner—Frank Mc Kenzie
Attorney, Agent, or Firm—Schmidt, Johnson, Hovey & Williams

[57] ABSTRACT

A drive mechanism especially useful in assemblage with a harmonic drive transmission for providing a desired rotational input to the wave generator of the harmonic drive transmission, and allows for a wide speed range selection while minimizing component wear, instability, and heat generation problems. Such a harmonic drive assembly is particularly useful in powering a controlled infeed or chill stand in a printing press and permits the precise adjustment of the tension of the continuous paper web moving through such a press. The drive mechanism supplies rotational movement from the input shaft of the harmonic drive transmission to the wave generator tuner shaft and includes pulley means operatively coupled to the input shaft, an arm assembly mounted for pivotal movement about the tuner shaft, and a positioning mechanism for precisely pivoting the arm assembly as desired. The arm assembly includes a variable sheave pulley operatively interconnected with the pulley means and tuner shaft, such that pivoting the arm assembly changes the pitch diameter of the variable sheave pulley and effects a corresponding change in the rotational velocity of the wave generator tuner shaft.

12 Claims, 3 Drawing Figures

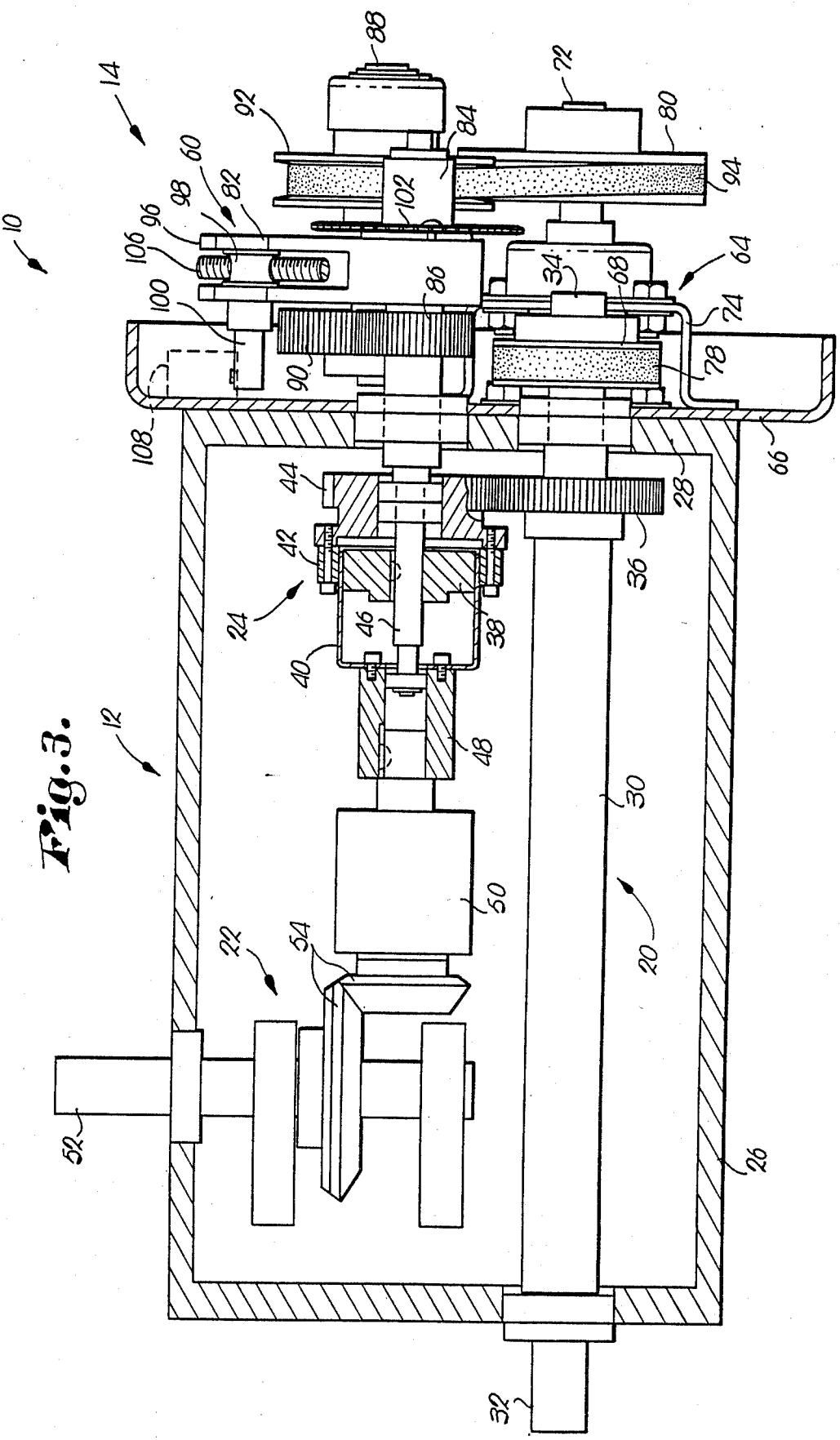

DIFFERENTIAL DRIVE MECHANISM

BACKGROUND OF THE INVENTION

1. Field of the Invention

The present invention relates to an improved drive mechanism adapted for use with a harmonic drive transmission to form a drive assembly, particularly useful for powering the controlled infeed or controlled outfeed of a printing press or the like for maintaining proper web tension in the printing press. More particularly, it is concerned with such a drive mechanism which interfaces between the power input shaft and wave generator tuner shaft of the harmonic drive transmission in such a manner that the rotational velocity of the wave generator is precisely prescribed.

2. Description of the Prior Art

In the printing press industry, it is quite typical to employ several work stations to perform a variety of work functions on a continuous web of paper travelling through the printing press. Thus, such a printing press might employ several lithographic printing stations, a dryer through which the web presses after being printed, a chill roll station for cooling the heated paper web after exiting the dryer, and possibly a bindery station for performing a cutting, sheeting, stitching, etc. bindery function on the moving web.

Those skilled in the art will appreciate that in such a web fed printing press, it is necessary to maintain the web under proper tension while travelling through the printing press. Thus, it is desirable to feed the web into printing stations through use of a controlled infeed so that proper tension is maintained in the web traveling through the printing stations. Proper web tension is necessary in the printing stations to give acceptable print quality and proper color-to-color registration. This web tension can be achieved by, for example, operating the controlled infeed at a speed of $-1.0\%$ to $0.0\%$ relative to the operating speed of the printing units.

Typically, in such printing presses the web is maintained under tension while transiting the dryer. That is, the web would be allowed to follow a "sine" wave path through the dryer to achieve more efficient drying of the web substrate and disrupt any boundary layer effect contiguous the web. A chill unit is typically employed following the dryer to cool the heated paper web and to provide an anchor point for the web for further printing press operation. For example, if a sheeting mechanism is employed in the printing press downstream of the chill stand, it is necessary to feed the web under proper tension to the sheeter to achieve proper cutoff lengths of the sheets. The sheet cutoff length is determined in large part by the web tension between the chill stand and the sheeter. Too high a tension in the web often results in a short cutoff sheet length, while too low a web tension usually results in too long of a cutoff sheet length. To achieve the proper web path through the dryer and the proper web tension after exiting the chill stand, it is desirable to have the capability to operate the chill stand rollers in a speed range from slightly less to slightly greater than the operating speed of the printing stations (e.g. $-0.5\%$ to $+1.5\%$).

To achieve proper web tension in a printing press, drive transmissions have been employed for operating the controlled infeed and chill stands (or other printing press operating units) using a variable speed transmission. It has been found that such variable speed transmissions operate best by using so-called harmonic drive transmissions to power the controlled infeed or chill stand. Harmonic gearing utilized in such harmonic drive transmissions is described in U.S. Pat. No. 2,906,143 to C. W. Musser, U.S. Pat. No. 3,565,006 to Stewart, and advertising brochures distributed by the United Shoe Machinery Corporation entitled "Harmonic Drive Pancake Gearing" HDUF13000-76 and "Harmonic Drive" HD-1000-5M-12/75, all of which are herein incorporated by reference.

Generally speaking, a harmonic drive gear includes a rotatable, elliptical wave generator; a flexible, externally-toothed, rotatable spline disposed about the wave generator; and an internally-toothed, circular spline disposed about the flexible spline. Preferably, the circular spline has a greater number of teeth than the flexible spline (e.g. two teeth), determined largely by the reduction ratio desired. In operation, rotation of the wave generator imparts a rotating elliptical shape to the flexible spline causing progressive engagement of its external teeth with the internal teeth of the circular spline, thereby imparting relative rotation to the flexible spline. It will be appreciated that the three basic harmonic drive components can be employed in a variety of ways to accomplish different power transmission functions, as more fully explained in the above-referenced patents and brochures.

It has heretofore been suggested to rotate the wave generator of such a harmonic drive transmission in such a way that the rotational velocity of the wave generator can be varied as desired. To this end, various drive mechanism have heretofore been employed between an input drive shaft and the wave generator or tuner drive shaft such that the rotational speed of the tuner shaft can be controlled. For example, one such drive mechanism includes a variable sheave pulley secured to the tuner drive shaft and a pivotal arm mounted for pivotal movement about the input drive shaft. The pivotal arm includes one or more pulleys drivingly interconnected to the input shaft. One of the pulleys on the pivotal arm is connected by a V-belt to the variable sheave pulley on the tuner shaft such that pivoting of the arm varies the rotational speed of the variable sheave pulley and in turn the tuner shaft.

Several problems, however, exist with this past drive mechanism design. For example, it was discovered that the speed range desirable for input to a controlled infeed or chill stand of a printing press could not be achieved using such a mechanism. Further, this mechanism was not only costly, but in addition, had stability problems with the pivotal arm. Thus, a significant advance in the art would be realized if an inexpensive drive mechanism were devised for interface with a harmonic drive transmission which had the speed range desired for use with the controlled infeed or chill stand of a printing press and did not exhibit the stability problems associated with past devices.

SUMMARY OF THE INVENTION

The problems associated with such past drive mechanisms are largely solved by the differential drive mechanism of the present invention. That is, the present invention operates to interface with a harmonic drive transmission to supply rotational movement to the tuner shaft of the wave generator, and to permit the precise adjustment of the rotational speed of the tuner shaft over a relatively wide range. Further, the present invention is not only cost effective, but additionally alleviates the stability problems associated with past devices, without significant heat generation or component wear problems. Thus, the differential drive mechanism of the present invention is adapted for use with a harmonic drive transmission to fulfill the power requirements of a controlled infeed or chill stand of a printing press.

Broadly speaking, the present invention is concerned with a differential drive mechanism for operably connecting an input shaft and an output shaft for varying the rotational velocity of the output shaft relative to the rotational velocity of the input shaft. The drive mechanism broadly includes pulley means operably coupled to the input shaft for rotation therewith, arm means operably mounted for pivotal movement about the axis of rotation of the output shaft, and variable sheave means operably mounted to the arm means for rotation about an axis spaced from the axis of rotation of the output shaft. Advantageously, the pulley means and variable sheave means are operably interconnected such that the rotational velocity of the variable sheave means is changed when the position of the variable sheave means is changed. Further, the drive mechanism includes means rotatably coupling the variable sheave means and output shaft, and positioning means operably connected to the arm means for pivoting the arm means about the output shaft axis. Thus, actuation of the positioning means pivots the arm means about the output shaft changing the position of the variable sheave means, which in turn changes the rotational velocity of the variable sheave means. This change in rotational velocity of the variable sheave means effects a corresponding change in rotational velocity of the output shaft. In preferred forms, the output shaft is the tuner shaft driving the wave generator of the harmonic drive transmission.

Preferably, the harmonic drive transmission includes a tuner shaft and input shaft extending generally parallel from one end of the transmission, with the input shaft operatively coupled to the circular spline and the tuner shaft operatively coupled to the wave generator. In such an embodiment, the variable sheave means of the drive mechanism is operatively coupled to drive the tuner shaft. That is, the variable sheave means and tuner shaft advantageously each present gears associated therewith, with the gears in operable mesh irregardless of the position of the pivotal arm means. In particularly preferred embodiments, the pulley means presents a first pulley of fixed pitch diameter mounted to the input shaft, a second pulley of fixed pitch diameter connected to the first pulley by a drive belt, and a third pulley of fixed pitch diameter operatively coupled to the second pulley for rotation therewith. The third pulley is connected to the variable sheave means by a second drive belt such that pivoting the arm means respositions the variable sheave means affecting a repositioning of the engagement of the second drive belt with the variable sheave means and a corresponding change in the rotational velocity of the variable sheave means.

BRIEF DESCRIPTION OF THE DRAWING

FIG. 3 is a sectional view taken along line 3—3 of FIG. 1 and depicts the combination of the harmonic drive transmission and drive mechanism of the present invention.

DESCRIPTION OF THE PREFERRED EMBODIMENT

Figure 1:
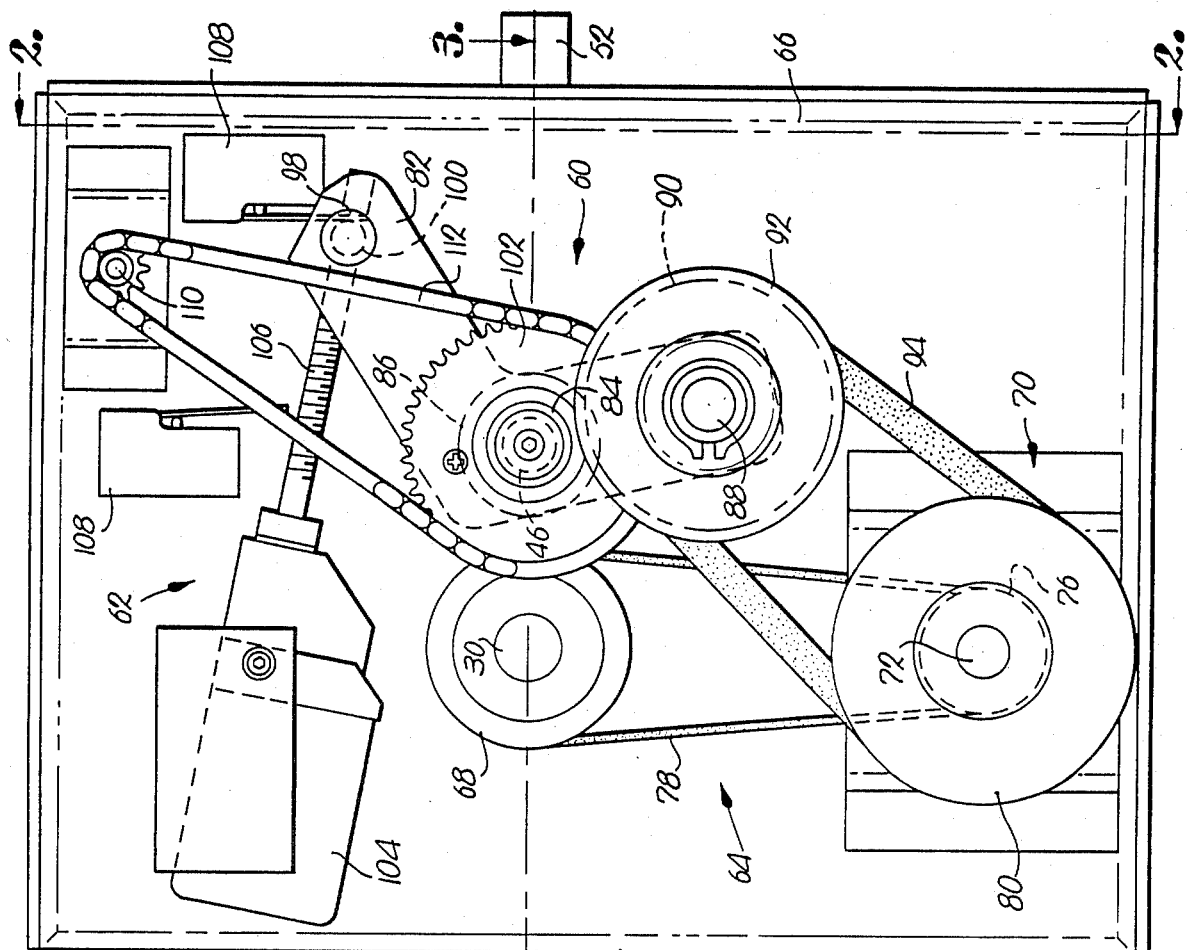
FIG. 1 is an elevational view of the differential drive mechanism of the present invention.

Turning now to the drawing (see FIG. 3), a harmonic drive assembly 10 is illustrated and broadly includes a harmonic drive transmission 12 and a differential drive mechanism 14 in accordance with the present invention. Although the harmonic drive assembly 10 might be used in a variety of different applications, the harmonic drive assembly 10 was particularly developed to power various manufacturing operations in a printing press. That is, the harmonic drive assembly 10 of the present invention has been found to be particularly useful in powering the controlled infeed and chill stand in a web fed printing press, enabling press control over the tension of the web traveling through the printing press.

In more detail, the harmonic drive transmission 12 (see FIG. 3) is similar in construction to known harmonic drives, and therefore, only the broad aspects thereof will be herein described. The harmonic gearing incorporated in the harmonic drive transmission 12 is more fully described in U.S. Pat. No. 2,906,143 to C. W. Musser, U.S. Pat. No. 3,565,006 to Stewart, and two advertising brochures distributed by the United Shoe Machinery Corporation entitled "Harmonic Drive Pancake Gearing" HDUF 13000-76 and "Harmonic Drive" HD-1000-5m-12/75. All of the aforementioned are incorporated by reference herein.

In broad aspects, the harmonic drive transmission 12 generally includes a power input assembly 20, a power output assembly 22, and the harmonic gearing 24 interposed between the input and output assemblies 20, 22. Advantageously, the harmonic drive transmission 12 is predominately enclosed by a casing 26 which includes a generally flat front mounting wall 28. The power input assembly 20 presents an elongated drive shaft 30, with the ends of the shaft rotatably mounted in bearings secured in the casing 26. The end 32 of the drive shaft 30 is preferably coupled to the printing press power source, while the opposite distal end 34 protrudes through front wall 28 for operative interconnection with the differential drive mechanism 14. The drive shaft 30 has mounted thereon a spur gear 36 adjacent the internal face of front wall 28.

The harmonic gearing 24 consists of four basic elements: a wave generator or tuner 38, the flex spline 40, and the circular spline 42. The wave generator 38 is an elliptically shaped bearing and is a rotating input element to the harmonic gearing 24. Flex spline 40 is an elastic steel ring with external spline teeth which receives the wave generator 38 therein. The circular spline 42 is a rigid, annular gear having internal teeth, usually having a few more teeth (e.g. two) than the flex spline to establish the positive transmission ratio. Those skilled in the art will appreciate that in operation, rotation of the wave generator 38 inparts a rotating elliptical shape to the flex spline 40 such that the flex spline 40 is deformed to engage the circular spline at two small areas 180° apart. Since the flex spline 40 typically has two less teeth than the circular spline 42, one counterclockwise revolution of the wave generator 38 results in a two tooth clockwise displacement of the flex spline 40 relative the circular spline 42.

Turning now to FIG. 3, the harmonic gearing 24 additionally includes an annular spur gear 44 rigidly secured to the circular spline 42 (as by the bolts shown).

Advantageously, the spur gear 44 is in operable mesh with the spur gear 36 of the power input assembly 20. The wave generator 38 is secured to an elongated tuner shaft 46, with the shaft 46 extending through the spur gear 44 and front wall 28 into operative engagement with the differential drive mechanism 14. Flex spline 40 is operatively coupled to the power output assembly 22. To this end, the output assembly 22 includes an annular, splined, drive link 48 secured to the flex spline 40 (as by the bolts shown). Coupling 50 interconnects the drive link 48 to the output shaft 52 by way of a bevel gear set 54 (preferably the bevel gear set 54 is designed for a 2:1 reduction ratio).

Turning now to the differential drive mechanism 14, there is broadly presented a pivot arm assembly 60, an arm positioning mechanism 62, and pulley means 64 operatively interconnecting the drive shaft 30 and the pivot arm assembly 60 (see FIG. 1). Advantageously, the differential drive mechanism 14 is mounted to the front wall 28 of the harmonic drive transmission 12 using a mounting plate 66 (preferably steel). Mounting plate 66 is generally flat, but has upturned sidewalls to present a cup-like structure, and further, is apertured to permit the drive shaft 30 and tuner shaft 46 to extend therethrough.

Figure 2:
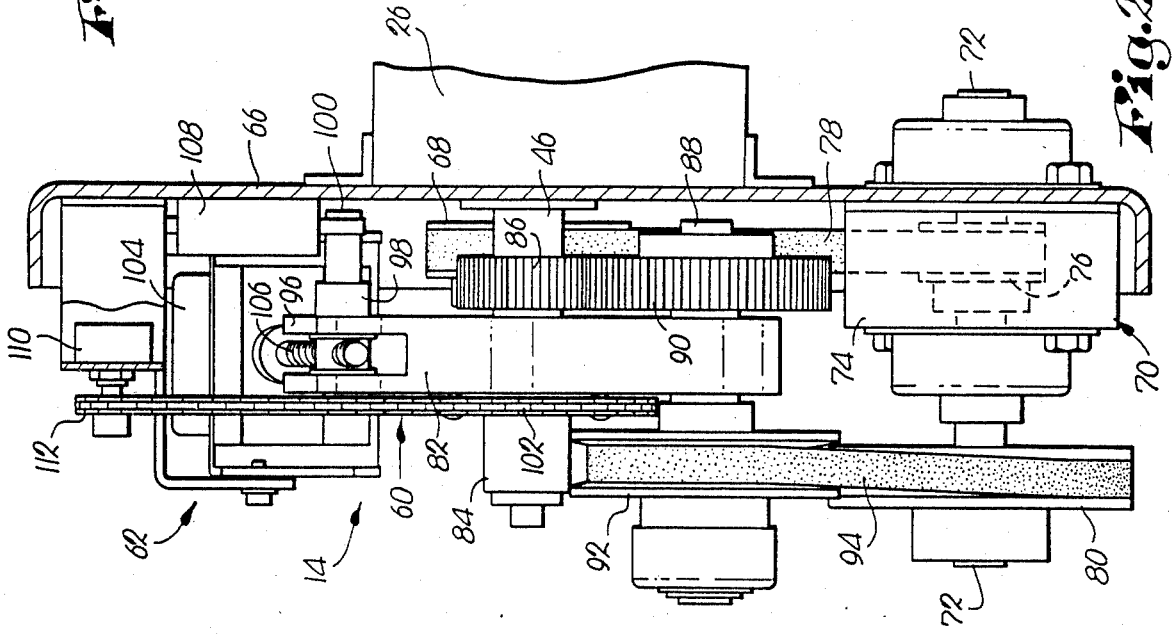
FIG. 2 is a fragmentary, sectional view taken along line 2—2 of FIG. 1 illustrating the drive mechanism of the present invention.

Turning first to the pulley means 64, a 24-tooth sprocket 68 is secured to the distal end 34 of the drive shaft 30 (see FIG. 1). Disposed beneath the sprocket 68 is an adjustable mounting assembly 70 presenting an elongated cylindrical axle 72 bearingly mounted in a mounting bracket 74 (FIG. 2). Advantageously, the mounting plate 66 has slots extending therethrough such that the mounting bracket 74 can be shiftably secured to the plate 66. That is, mounting bracket 74 presents a plurality of bolts for interconnecting the bracket 74 to the plate 66, and with the bolts loosened, the bracket 74 is adjustable relative to the plate 66. Mounting bracket 74 is U-shaped, to protect and surround a 16-tooth sprocket 76 secured to the axle 72. Advantageously, the sprocket 68 and sprocket 76 are rotatably interconnected by a notched timing belt 78 (FIG. 1). To the distal end of the axle 72 is secured a fixed pitch diameter pulley 80, preferably 4.25" pitch diameter.

Pivot arm assembly 60 presents an L-shaped in plan form pivot arm 82 which is interfitted with a bearing 84 at a proximal location, the bearing 84 rotatably receiving the distal end of the tuner shaft 46. Turning to FIG. 2, it will be seen that between the pivot arm 82 and mounting plate 66 a 24-tooth gear 86 is secured to the tuner shaft 46.

The lowermost end of the pivot arm assembly 60 presents a variable sheave means operably mounted thereto. To this end, an elongated cylindrical spindle 88 is rotatably received in a bearing of pivot arm 82 and has a 44-tooth gear 90 secured to the distal end thereof between the pivot arm 82 and mounting plate 66. It will be observed that the gears 86, 90 are constantly in operable mesh for simultaneous rotation, regardless of the position of the pivot arm assembly 60. The other distal end of the spindle 88 has secured thereto a variable sheave pulley 92, which advantageously is rotatably connected to the pulley 80 by a V-belt 94. Preferably, the variable sheave pulley 92 is of a type similar to that manufactured by Lovejoy, Inc. of South Haven, Mich., and has a pitched diameter adjustable from approximately 3.60" to 1.62".

Turning to FIGS. 2-3, it will be seen that the end of pivot arm 82 remote from variable sheave pulley 92 presents a U-shaped clevis 96, with the clevis arms apertured for the reception of a turnbuckle 98. The turnbuckle 98 is threadingly apertured in the region between the clevis arms and further presents an elongated cylindrical shank 100 extending towards mounting plate 66. A final feature of the pivot arm assembly 60 (see FIG. 1) is the relatively enlarged circular sprocket 102 secured to the pivot arm 82 such that the sprocket 102 and tuner shaft 46 are coaxial and define the point about which pivot arm 82 pivots.

Turning to the positioning mechanism 62, there is presented an electric motor 104 secured to the mounting plate 66 and having appropriate switchology (not shown) for actuation as desired. The electric motor 104 is operable to rotate an elongated drive screw 106. Drive screw 106 extends from the electric motor 104 with the screw flights received in the turnbuckle 98 such that actuation of the motor 104 produces movement of the turnbuckle 98 along the length of the drive screw 106. That is, operation of the electric motor 104 pivots the arm 82 about the tuner shaft 46. A pair of microswitches 108 are secured to the mounting plate 66 adjacent each end of the drive screw 106, with the microswitches 108 configured to contact the shank 100 of the turnbuckle 98 thereby disengaging the motor 104 and limiting the amount of pivotal travel of the pivot arm assembly 60. Further, a potentiometer 110 is secured to the mounting plate 66 and interconnected to the sprocket 102 by timing chain 112 to sense the relative position of the pivot arm assembly 60.

In use, it will be appreciated that the main function of the differential drive mechanism 14 is to supply rotational input from the input drive shaft 30 to the tuner shaft 46, while permitting the rotational velocity of the tuner shaft 46 to be varied as desired. It will be observed that the drive shaft 30 additionally supplies rotational input to the circular spline 42 through the spur gear set 36, 44. Thus, the differential drive mechanism 14 is operable to supply a certain rotational velocity through the wave generator 38 through the tuner shaft 46 to make minor adjustments in the output of the harmonic drive assembly 10.

To effect a speed change, the pivotal arm assembly 60 is pivoted about the tuner shaft 46 by actuation of the electric motor 104. This pivoting action changes the drive center distance between the variable sheave pulley 92 and the pulley 80. This pivoting of the arm assembly 60 either pulls the V-belt 94 deeper into the sheave of pulley 92 or allows the V-belt to recede radially outward in the sheave. This change in the pitch diameter of the variable sheave pulley 92 corresponds to a change in rotational velocity of the pulley 92, which, in turn, is imparted to the tuner shaft 46 through the gear set 86, 90. The relative speed of the tuner shaft 46 is inferentially monitored by potentiometer 110 which indicates the position of the differential arm assembly 60.

Differential drive mechanism 14 has proven effective in solving the problem of optimum input to a harmonic drive transmission. That is, the harmonic drive assembly 10 is operable over a relatively wide speed range (approximately 2.5-3%) and exhibits enhanced stability over the entire speed range. Further, the V-belt wear and heat generation problems often associated with variable sheave pulley construction is minimized by the differential drive mechanism 14 of the present invention. The durability and operability of the differential drive mechanism 14 is further complemented by its relatively low cost, to give an improved harmonic drive assembly ideally suited for use in the printing press industry.

I claim:

1. A drive mechanism for operably connecting an input shaft and an output shaft for varying the rotational velocity of the output shaft relative to the rotational velocity of the input shaft, said drive mechanism comprising:
   pulley means operably coupled to said input shaft for rotation therewith;
   arm means operably mounted for pivotal movement about the axis of rotation of said output shaft;
   variable sheave means operably mounted to said arm means and rotatable about an axis spaced from the axis of rotation of said output shaft;
   means operably interconnecting said pulley means and said variable sheave means for rotating said variable sheave means in response to rotational movement of said pulley means;
   means operably coupling said variable sheave means and said output shaft for rotating said output shaft in response to rotational movement of said variable sheave means; and
   positioning means operably connected to said arm means for pivoting said arm means thereby changing the rotational velocity of said variable sheave means when the position of said variable sheave means is changed and effecting a corresponding change in the rotational velocity of said output shaft.

2. A mechanism as set forth in claim 1, said pulley means comprising a first pulley of fixed pitch diameter mounted to said input shaft, a second pulley of fixed pitch diameter connected to said first pulley by a drive belt, and a third pulley of fixed pitch diameter operably coupled to said second pulley for rotation therewith, said third pulley being connected to said variable sheave means by a drive belt.

3. A mechanism as set forth in claim 2, said second and third pulleys being mounted on the same axle and said axle being adjustably positionable relative said input shaft for varying the tension in the drive belt between said first pulley and said second pulley.

4. A mechanism as set forth in claim 1, said variable sheave means being operably connected to a first gear, and a second gear being operably coupled to said output shaft, said first and second gears being in operable mesh.

5. A mechanism as set forth in claim 1, including means for indicating the relative position of said arm means thereby indicating the rotational velocity of said output shaft relative the rotational velocity of said input shaft.

6. A mechanism as set forth in claim 1, including a sprocket mounted to said arm means and a potentiometer operably connected to said sprocket such that pivotal movement of said arm means is detected by said potentiometer.

7. A mechanism as set forth in claim 1, said arm means comprising an L-shaped, generally flat arm having said variable sheave means mounted adjacent one end, the positioning means connected adjacent the other end, and the output shaft axis disposed therebetween.

8. A mechanism as set forth in claim 1, said positioning means presenting a threaded screw, a motive means for rotating said threaded screw, and a threaded journal operably receiving said threaded screw and operably coupled to said arm means such that rotation of said screw pivots said arm means.

9. In a harmonic drive assembly having a harmonic drive transmission presenting a rotatably mounted circular spline, a flexible spline in operative engagement with the circular spline, an output shaft operatively connected to the flexible spline, a wave generator operatively received within the flexible spline, a tuner shaft operatively coupled to the wave generator for supplying the input thereto, and an input shaft operatively coupled to the circular spline for supplying the input thereto, said tuner shaft and input shaft being generally parallel and extending from one end of the harmonic drive transmission, a drive mechanism mounted to said one end and operatively interconnecting the tuner shaft and input shaft comprising:
   arm means operatively mounted for pivotal movement about said tuner shaft;
   variable sheave means rotatably mounted adjacent one end of said arm means and having means for varying the pitch diameter thereof;
   means operatively connecting said variable sheave means and said tuner shaft for rotating said tuner shaft in response to rotational movement of said variable sheave means;
   means operably coupling said input shaft and said variable sheave means for rotating said sheave means in response to rotational movement of said input shaft, including belt means operatively engaging said variable sheave means; and
   positioning means operatively connected to said arm means other end for pivoting said arm means about said tuner shaft thereby changing the position and rotational velocity of said variable sheave means as the engagement of said belt means with said variable sheave means is changed, said rotational velocity change being transmitted to said tuner shaft for varying the rotational velocity of said wave generator.

10. A shaft as set forth in claim 9, said means connecting said variable sheave means and said tuner shaft including a first pulley means secured to said input shaft, a second pulley means operatively connected to said first pulley means, and a third pulley means of a fixed pitch diameter mounted on the same shaft as said second pulley means for rotational movement therewith.

11. A shaft as set forth in claim 10, said belt means comprising a closed loop V-belt connecting said third pulley means and said variable sheave means such that pivotal movement of said arm means moves the rotational axis of said variable sheave means relative the rotational axis of said third pulley means thereby changing the pitch diameter of said variable sheave means and the rotational velocity thereof.

12. In combination;
   a harmonic drive transmission presenting an engagement face and having an input shaft and tuner shaft extending generally orthogonally from said face;
   a mounting plate secured to said engagement face and having structure defining one or more apertures permitting the passage of said input and tuner shafts through said plate;
   a first pulley secured to said input shaft for rotational movement therewith;
   a tensioning assembly adjustably mounted to said plate and having a rotatable axle and second and third pulleys secured to said axle for rotation therewith;

belt means operatively coupling said first and second pulleys for rotating said third pulley in response to rotational movement of said input shaft;

a pivotal arm assembly comprising
an arm mounted for pivotal movement about said tuner shaft,
a spindle rotatably mounted to said arm,
a first gear secured to said spindle for rotation therewith,
a variable sheave pulley having a variable pitch diameter, said variable sheave pulley being secured to said spindle for rotation therewith;

belt means operatively coupling said third pulley and said variable sheave pulley for rotating said variable sheave pulley in response to rotational movement of said third pulley;

a second gear secured to said tuner drive shaft for rotation therewith, said first and second gears being in operable mesh; and positioning means mounted to said plate and operably connected to said arm for pivoting said arm and changing the position of said variable sheave pulley thereby changing the rotational velocity of said variable sheave pulley and a corresponding change in the rotational velocity of said tuner shaft.

* * * * *